L. R. ROBERTS.
AUTOMATIC TYPE WRITER ACTUATOR.
APPLICATION FILED JUNE 25, 1913.

1,171,354.

Patented Feb. 8, 1916.
9 SHEETS—SHEET 1.

FIG. 1.

WITNESSES:

L. Bittiger
F. E. Alexander

INVENTOR:
Lyman R. Roberts
BY
B. C. Stickney
ATTORNEY.

L. R. ROBERTS.
AUTOMATIC TYPE WRITER ACTUATOR.
APPLICATION FILED JUNE 25, 1913.

1,171,354.

Patented Feb. 8, 1916.
9 SHEETS—SHEET 7.

WITNESSES
L. Fittiger.
F. E. Alexander

INVENTOR:
Lyman R Roberts
A. L. Stickney
ATTORNEY.

L. R. ROBERTS.
AUTOMATIC TYPE WRITER ACTUATOR.
APPLICATION FILED JUNE 25, 1913.

1,171,354.

Patented Feb. 8, 1916.
9 SHEETS—SHEET 9.

FIG. 14.

UNITED STATES PATENT OFFICE.

LYMAN R. ROBERTS, OF RUTHERFORD, NEW JERSEY, ASSIGNOR TO UNDERWOOD TYPEWRITER COMPANY, OF NEW YORK, N. Y., A CORPORATION OF DELAWARE.

AUTOMATIC TYPE-WRITER ACTUATOR.

1,171,354.

Specification of Letters Patent.

Patented Feb. 8, 1916.

Application filed June 25, 1913. Serial No. 775,654.

*To all whom it may concern:*

Be it known that I, LYMAN R. ROBERTS, a citizen of the United States, residing in Rutherford, in the county of Bergen and State of New Jersey, have invented certain new and useful Improvements in Automatic Type-Writer Actuators, of which the following is a specification.

This invention relates to mechanism for automatically feeding envelops around the platens of typewriting machines, and has a special value in connection with automatic typewriter operators, such as shown for instance in my pending Patent No. 1,109,597, granted September 1, 1914, to Lyman R. Roberts and Charles L. Davis jointly. In said patent, a perforated sheet is run over a tracker board, whereby hammers are caused to operate the keys of the typewriter. By means of suitable perforations in the master sheet, a pneumatic mechanism is controlled for line-spacing the platen of the typewriting machine, and returning the carriage to begin a new line.

In accordance with the present invention, the envelops are placed in a receptacle, and one by one are picked up by hooks provided upon an endless belt or pair of belts, which carry the envelops around the platen of the writing machine; said belts being driven by a suitable train of mechanism connected to the platen itself. The envelop-feeding belts are illustrated as made of thin flexible metal strips, and the hooks are punched at intervals in the strips, to project slightly therefrom, in position to catch under the flaps of the envelops. The receptacle for the stack of envelops is provided with means which tend to project the flaps slightly away from the bodies of the envelops, so as to insure the catching of the hooks thereon. The stack of envelops is constantly urged forward by a spring-pressed follower, so that as soon as one envelop is withdrawn, another takes its place.

The envelop-feeding devices are all mounted upon the platen frame of a typewriter. In the case of the Underwood typewriter, to which my invention is shown applied, this platen frame shifts up and down for writing capitals and small letters, and the envelop-feeding devices are mounted upon a light framework comprising a pair of standards, which are secured to the platen frame of the typewriter, and upon which is mounted a belt-driving shaft having a pair of pulleys over which the belts run, and also having a pinion which is connected by an endless chain, to a sprocket wheel fixed to the revolving platen. Said belt pulleys carry teeth, and the belts are perforated to receive the teeth, and hence are positively connected by said pulleys, shaft, pinion, chain and sprocket wheel to the platen. The rotation of the platen, and hence the operation of the envelop-feeding devices, may be effected by hand, by means of the usual line-spacing lever, but in the application referred to, said lever is operated by the pneumatic machine whenever a suitable perforation in the master sheet runs over the tracker board. Accordingly, the line-feeding of the envelops during the writing of the addresses is, in the present instance, preferably controlled by such master sheet in the same manner. To advance the envelops, after the completion of one address, to position to begin writing the next address (on the succeeding envelop), a succession of perforations is provided in said master sheet, to cause repeated actuations of the line-spacing lever of the typewriter; about eight or ten perforations being usually sufficient for the purpose. Since the master sheet may be prepared for addressing a very large number of envelops, and since each of the envelops must be brought automatically to the proper position to receive the address, I provide the envelop-catching hooks at intervals upon the belts equal to exact multiples of the line-spacing movement of the platen; and as a result a certain number of operations of said line-spacing lever is sure to bring the next envelop to the exact position required for beginning the writing of the address thereon, and there is no liability of gradual creeping of the series of envelops, nor possibility of the result that part of the address shall be written on one envelop and the remainder on another.

Reference is made to my Patent, No. 1,135,140, granted April 13, 1915, with respect to certain features originally contained therein but subsequently transferred to this case. When the application which ultimately merged into said patent, was filed, it contained a reference to an earlier co-pending application No. 428,050, filed April 20, 1908, which has since merged into the above-mentioned Patent No. 1,109,597. Said Patent No. 1,109,597 shows a pneumatic typewriter operator mechanism, and said Patent No. 1,135,140 shows certain parts of said mechanism. The present application, No. 775,654, is therefore based upon both of said patents, because it shows the entire pneumatic typewriter operator mechanism which is disclosed in said Patent No. 1,109,597, and the entire envelop-feeding mechanism disclosed in said Patent No. 1,135,140. In this present application, No. 775,654, claims are made to the pneumatic devices for operating envelop or work-feeding means which are disclosed in Patent No. 1,135,140. Claims in Patent No. 1,109,597 have been limited to typewriting mechanism, and no claim is contained therein for pneumatic or other means for operating such typewriting mechanism.

Other features and advantages will hereinafter appear.

The typewriting machine comprises keys 1, which cause type bars 2 to strike against the front side of a cylindrical platen 3. The latter is journaled by means of an axle 4 in the ends 5 of the platen frame, said ends connected by an inclined plate 6, which forms the usual paper shelf behind the platen. The platen frame rests upon a carriage 7, which, it will be understood, is fed in letter-space direction in the usual manner at the operation of the keys 1. The envelops 6ª are stacked in a receptacle at the back of the machine, said receptacle comprising sides 8, a floor 9, and a front plate 10 having at its bottom an opening 11, down through which the envelops are withdrawn. The envelops are picked up by claws, prongs or hooks 12 provided upon work-supporting bands or belts 13, whereby the envelops are carried around the under side of the platen and up in front thereof to be imprinted by the type bars 2. Each of said belts 13 consists of a very thin flexible metal strip, the ends of which may be joined in any suitable manner, as by means of a tongue 14 at one end passing through an opening 15 in the other end, Fig. 8. The belts extend upwardly from the platen and run over a pair of guiding pulleys 16, fixed upon a horizontal drive-shaft 17, and having teeth 18 to engage perforations 19 formed in the belts, whereby the latter are positively driven and caused to travel in unison.

The drive-shaft 17 is provided with a sprocket pinion 20, over which runs an endless sprocket chain 21; and to the platen 3 is fixed a sprocket gear 22, over which said chain also runs. The parts are preferably so proportioned that the surface movement of each envelop or other work-piece at each line-spacing operation is exactly equal to the surface movement of the platen, and preferably the feeding of the envelops is aided by the usual pressure rolls 23, 24, running on the under side of the platen, said rolls preventing the envelops from dropping off from the hooks 12. The latter, because of their thinness, are quite yielding, and they may run freely between the rolls 23, 24 and the platen. The platen of the Underwood machine shown in the drawings is advanced intermittently by a lever 25 having the usual connection to the platen, including a slide 26 and a pawl 27, the latter engaging the usual line-space wheel 28, which may be provided with the usual appurtenances. Said drive-shaft 17 is carried by a pair of standards or supports 29, 30 in the form of plates, having at their lower ends front and rear hooks 31, 32, to catch respectively upon the usual tie-rod or shaft 33, which extends from end to end of the platen frame, and the rolled or bead-portion 34 which is usually formed upon the top of the paper shelf 6. Each standard 29, 30 is also provided with a strap 35, adjustably secured thereto by a screw 36 passing through a slot 37; said strap having a foot 38 to rest upon the platen frame end, to which it is secured by a screw 39; the whole forming a light structure of great rigidity, said strap 35 inclining downwardly and outwardly from the standard to buttress the same. The standards may also be connected by tie-rods 40 and 41; and upon these tie-rods may be placed idle pulleys 42, 43, to guide the envelop-feeding belts.

Figure 6:
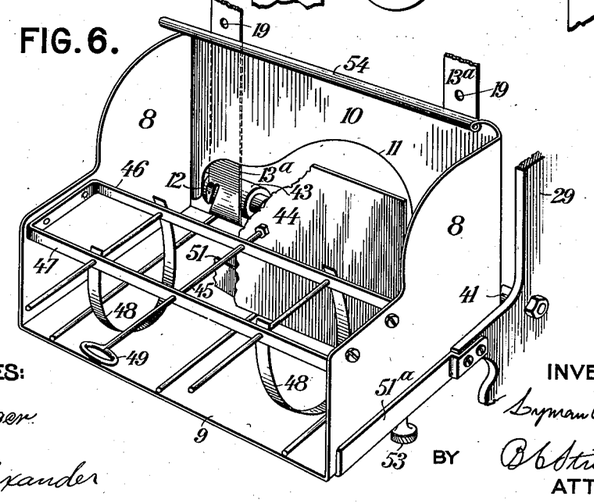
Fig. 6 is a rear perspective view of the envelop receptacle.

The envelops 6ª are stacked on edge in inverted positions with their tops resting upon the floor 9 of the receptacle, and with their flaps foremost, in position to be presented to the envelop-feeding belts, as seen at Fig. 6. The envelops are pressed forward against the front plate 10 by means of a vertical follower plate 44 having a horizontal guiding stem 45 slidable forwardly and backwardly in guides 46, 47. A pair of bow-shaped springs 48, secured to the guide 47, press against the follower 44, and constantly urge the pack of envelops forward. The stem 45 is prolonged rearwardly and carries a handle 49, for convenience in withdrawing the follower plate 44, to permit the introduction of a fresh stack of envelops.

Figures 7, 8:
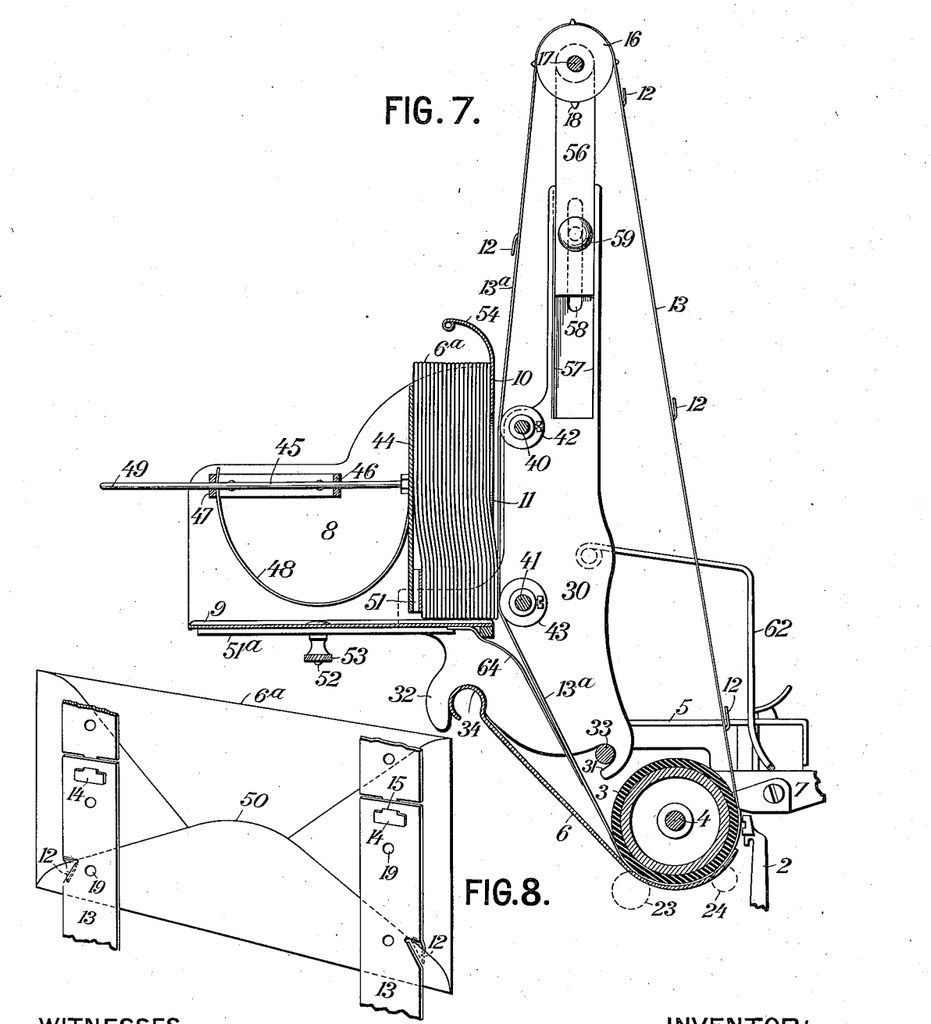
Fig. 7 is a sectional side elevation of the envelop-feeding devices.
Fig. 8 is a perspective detail, to illustrate the manner in which the hooks catch within the flap of the envelop.
Figure 9:
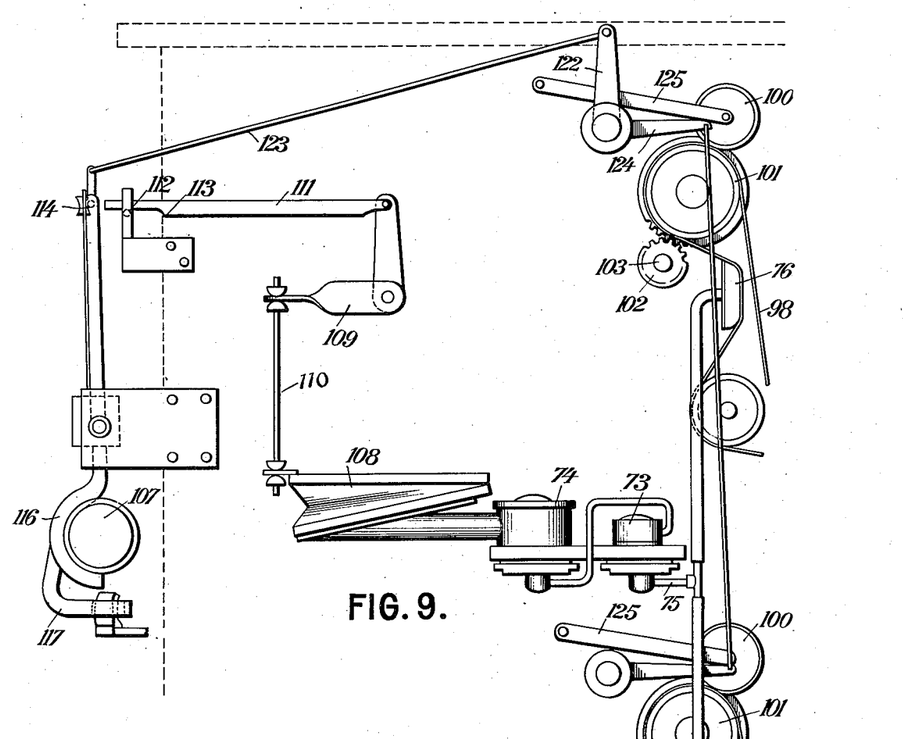
Fig. 9 is a view of the mechanism for controlling the line-spacing and the return of the typewriter carriage.
Figure 10:
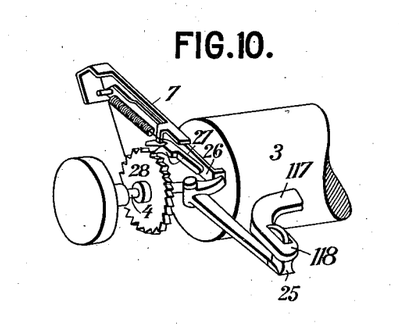
Fig. 10 is a view of the usual line-space mechanism.

As the platen is rotated, the hooks projecting from the rear side of the rear reaches 13ª of the strips 13, descend in pairs, with points foremost, in front of the front plate 10 of the envelop receptacle, and pass down along the body of the foremost envelop, and catch within the flap 50 thereof near the ends of said flap; said hooks being preferably formed upon the outer edges of the belts, as illustrated at Fig. 8, for this purpose. The flap portion of the front envelop is caused to protrude slightly through the opening 11 in the plate 10 (said opening being large enough to admit the entire flap of the envelop), so as to insure that the hooks 12 shall catch within said flap. This protrusion is effected by bringing forward the lower portion of the follower 44, as by placing a plate or bar 51 upon the front face thereof, as at Fig. 7. The belt guiding rolls 42 and 43 are placed just in front of the envelop receptacle, so that the thin yielding hooks are guided downwardly in contact, or almost in contact with said front plate 10, and tend to spring rearwardly against and glide down in contact with the body of the envelop and to insert themselves between said body and the protruding flap. From the lower guide roll 43, the belt is led directly around the platen, and thence directly up to the toothed guide pulley 16. The receptacle may be detachably connected to a pair of horizontal brackets 51ª, projecting rearwardly from the standards 29 and 30, by means of threaded studs 52 projecting below the floor of the receptacle and nuts 53 threaded upon said studs.

Figure 1:
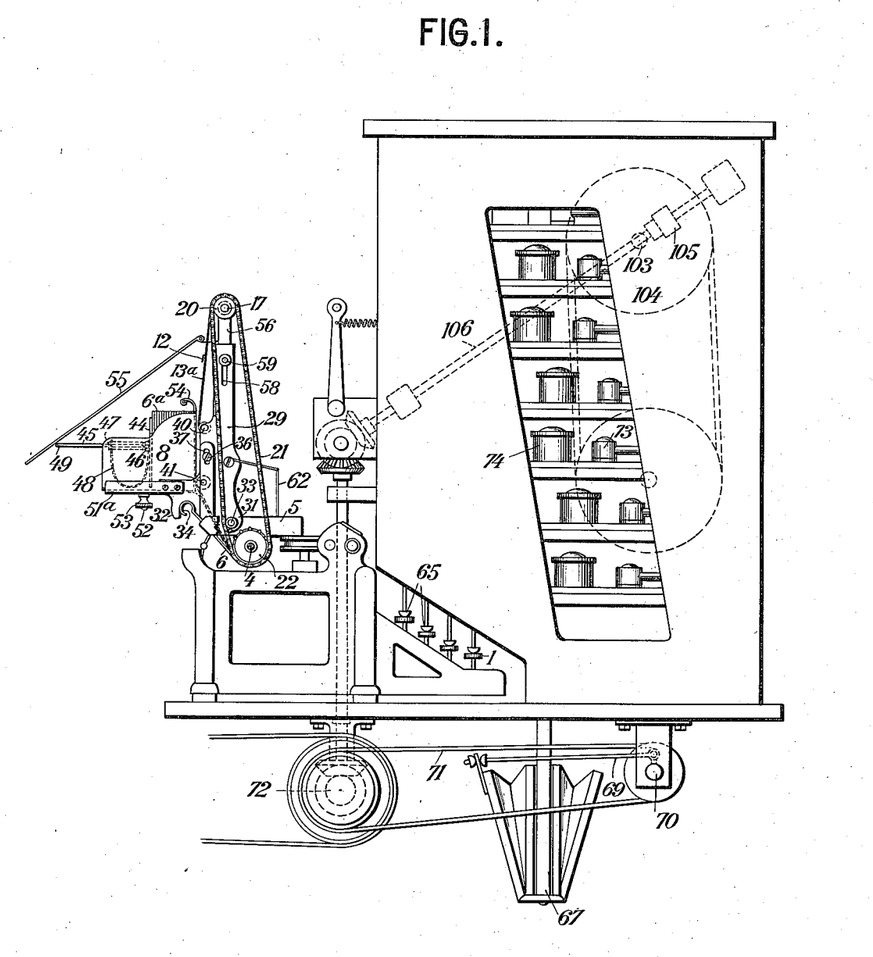
Figure 1 is a side elevation of my invention, showing a pneumatic typewriter operator connected to operate the usual form of an Underwood typewriting machine, upon which the envelop feeder is mounted.
Figure 2:
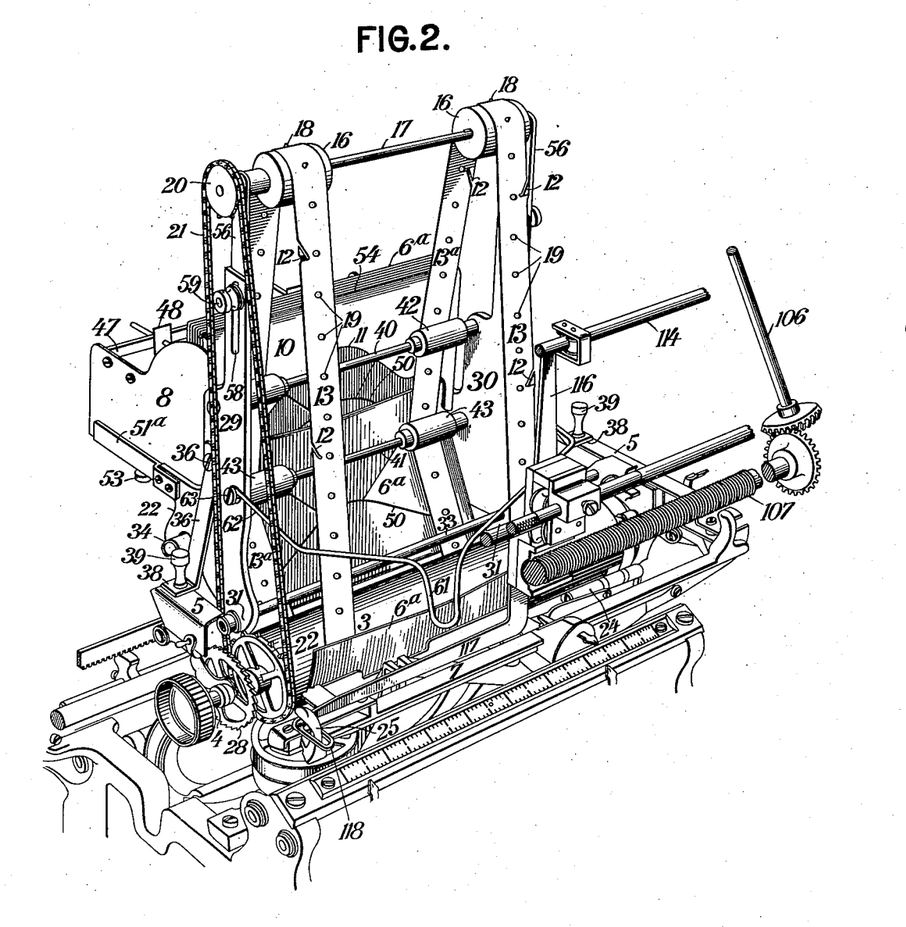
Fig. 2 is a front perspective view of the envelop feeder on the typewriter, with such parts of the operator shown, whereby the line-space mechanism is operated to feed the envelops.

In operation, the reciprocation of the line-space lever 25 effects in the usual manner, and through the slide 26 and pawl 27, the rotation of the ratchet wheel 28 and the platen 3, together with the sprocket wheel 22 on said platen. By means of the chain 21 and pinion 20, rotation is simultaneously effected of the drive-shaft 17 and the toothed pulleys 16, whereby the feeding strips 13 are advanced simultaneously with the rotation of the platen. As the rear hooks 12 descend, they run down past the plate 10, (the upper edge of which is curved rearwardly at 54, so that the springy hooks cannot catch thereon) and press yieldingly against the envelops and engage the flap 50 of the foremost envelop and draw the same downwardly from the receptacle, as seen at Fig. 2, and carry it forwardly under the platen and up in front thereof, where the address is written by the operation of the keys 1, the handle 25 being operated at the conclusion of each line, both to line-space the envelop and return the carriage 7 to begin a new line of writing.

The platen is rotated sufficiently to bring the succeeding envelop into position for writing, the envelops following one another around the platen, as they are caught upon the hooks. After writing, the envelops are carried up by the belts and over the guiding pulleys 16 and discharged by the hooks upon an inclined table or chute 55 extending rearwardly and downwardly from the standards 29, 30.

As soon as all the envelops have been fed, the handle 49 may be pulled backwardly and a fresh stack inserted into the receptacle, when the operation may be repeated. For keeping the envelop-feeding belts 13 in taut condition, the drive-shaft 17 is mounted upon a pair of posts or sections 56 adjustable vertically in guides 57 formed in the tops of the standards 29, 30; said standards having vertical slots 58 through which project screw studs 59 from the posts 56; the latter being secured by nuts 60. The nuts may be loosened and the posts 56 dropped when the machine is to remain out of use to discontinue the necessary working tension upon the double belt.

A front guide for the envelops may be formed of wire and consist of an inverted looped portion 61, pendent from arms 62 secured by screws 63 to the standards 29, 30; the guiding portion 61 flaring forwardly at its lower end at a point near the platen 3, in position to catch the leading edge of the envelop and hold it back, while the lower portion of the envelop is curved around the bottom of the platen, this guide being effective until the envelop resumes its normal straight condition and rides up the rearwardly inclined forward reach of the double belt.

It will be understood that each operation of the line-space lever 25 causes a single line-spacing movement of the platen. Hence the movements of the envelop-carrying double belt are equal to the line-feeding movements of the platen. The intervals between the hooks 12 are multiples of the line-spacing interval, so that a given number of vibrations on the lever 25 will advance one pair of hooks to exactly the position first occupied by the preceeding pair of hooks.

Where the grip exerted by the hooks 12 on the envelops is not sufficient to hold the envelops in place on the belt after they have been drawn from the receptacle, I provide a table 64 extending downward from the floor of the receptacle behind and in engagement with the reach 13ª of the belt. Prior to the withdrawal of the upper edge of the envelop from the receptacle, the lower edge of the envelop, with the hooks in engagement with the flap, will be drawn between the table and the belt. The table operates to retard the passage of the envelop downward, as by pressing the envelop gently against the belt, creating frictional resistance, so as to prevent the disengagement of the envelop from the hooks. Otherwise the envelop once free from its receptacle might drop out of the hooks and fail to be properly printed and discharged from the machine. The table 64 may be yielding to accommodate envelops of varying thicknesses. The table coöperates with the belt in conducting the envelops to the platen.

One of the objects of the present invention is to render it practicable to address large quantities of envelops rapidly and inexpensively by means of previously perforated master sheets, which of course may be used repeatedly, as required.

The typewriter keys are operated by means of a series of hammers 65, each of which is attached to one of the power pneumatics 66, all connected to an exhaust pump or bellows 67. The pump 67 is operated by a pitman 69 on shaft 70 connected by a belt 71 to main power shaft 72.

Figures 11, 12, 13:
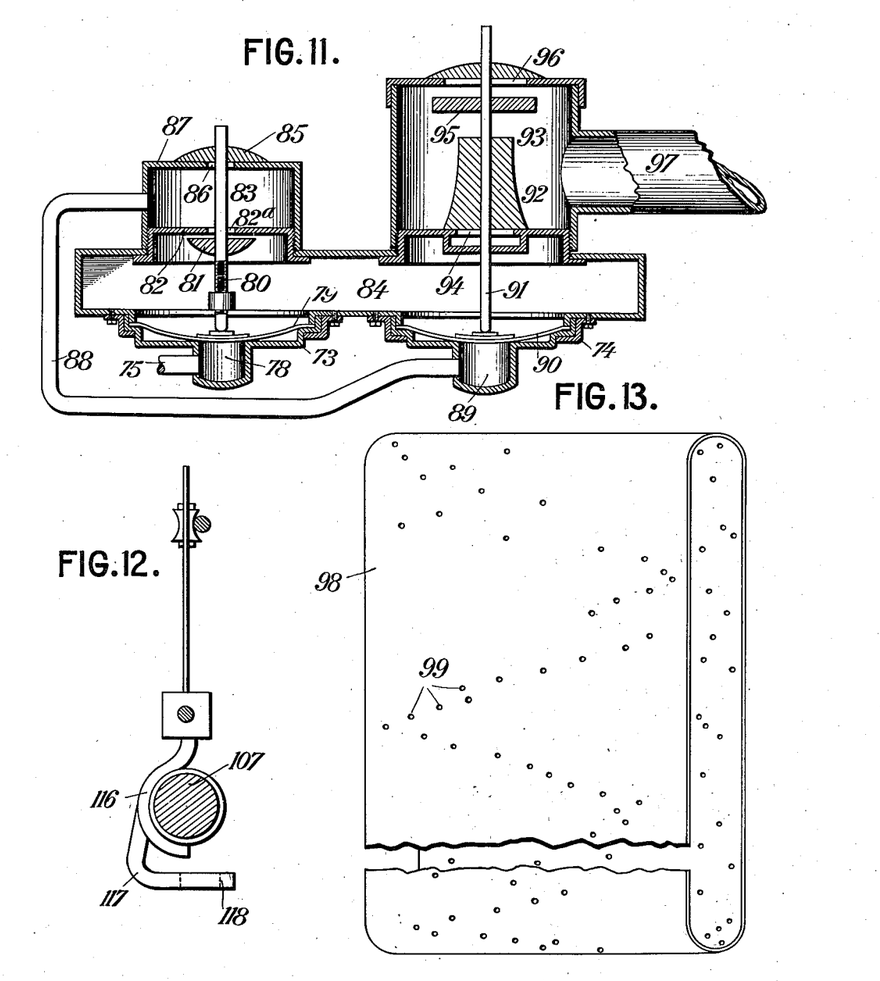
Fig. 11 is a sectional view of the primary and secondary pneumatics which control the collapsing of a bellows.
Fig. 12 is a view showing the half-nut in engagement with the screw or worm for line-spacing or returning the carriage.
Fig. 13 is a view of one of the master sheets.
Figure 14:
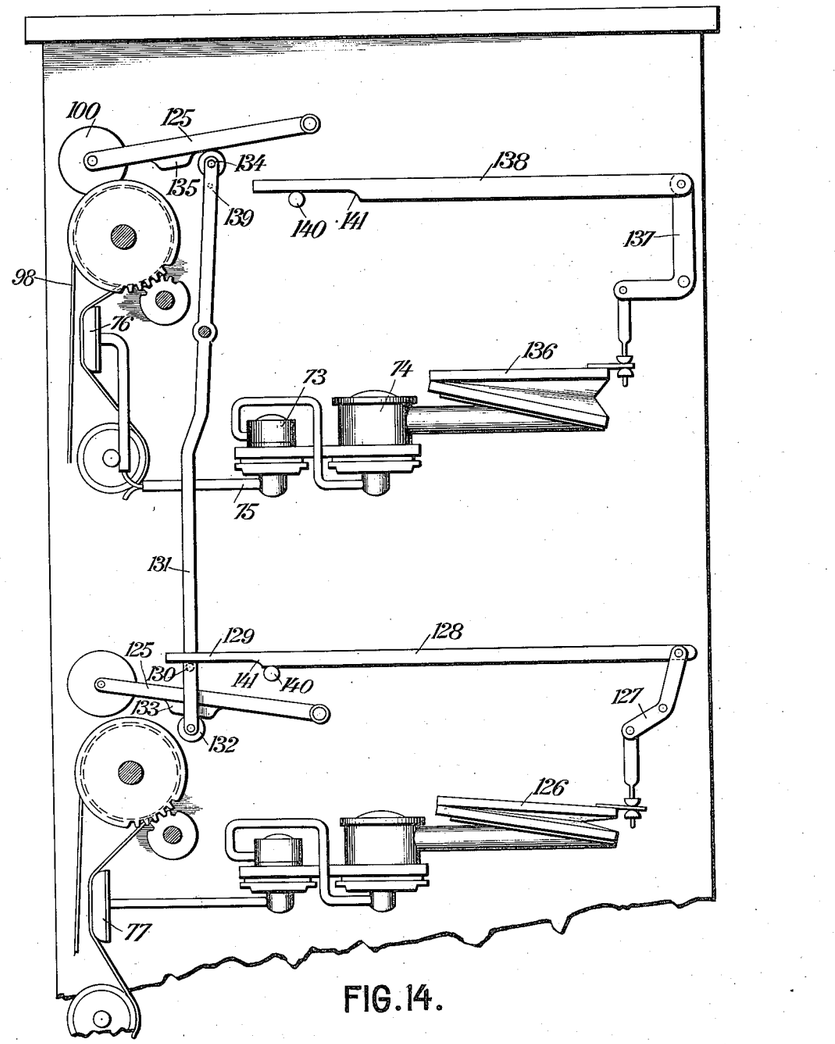
Fig. 14 is a view showing the mechanism for controlling the two master sheets, so that either one may be fed while the other is at rest.

The collapsing of a power pneumatic 66, to operate a key hammer 65, is controlled by means of a primary and a secondary pneumatic 73, and 74, Fig. 11. Each primary 73 is connected by a separate tube 75 to the tracker boards 76, 77, so that its action may be controlled from either tracker. These trackers are provided with apertures, one for each pneumatic actuator, which apertures are normally held closed, but may be opened to admit air to the primary pneumatics 73.

When air is admitted through an aperture in either of the tracker boards 76, 77, it will flow through the connecting pipe 75 to a chamber 78 in the bottom of the primary 73 (see Fig. 11), to lift the diaphragm 79. This lifts the stem 80, to cause the valve 81 to close the opening 82ª in the seat 82, shutting off the chamber 83 from suction chamber 84; at the same time the valve 85, also fast on the valve stem 80, is raised from opening 86 through casing 87 of chamber 83 and permits the external air to enter. The air upon entering the chamber 83 is conducted through pipe 88 to chamber 89 in the bottom of secondary pneumatic 74, similar to the chamber in the primary pneumatic, and raises the diaphragm 90. This lifts the valve stem 91 to unseat the valve 92 and allow the air in the chamber 93 to be sucked out through the opening 94 into the suction chamber 84, while a second valve 95 on the stem 91 closes the opening 96 in the top of chamber 93. As the latter is connected through pipe 97 to a power pneumatic 66, the air in said pneumatic will also be sucked out and the pneumatic itself will collapse and operate a hammer 65 to depress a typewriter key 1.

When the aperture in the tracker board is again closed by the farther movement of the master sheet, the pressure on the primary diaphragm 79 is reduced as by means of a pin hole or bleed opening in the diaphragm, permitting the air in chamber 78 to escape into the exhaust chamber 84, and the valve stem 80 will drop to seat the valve 85 over the opening 86, and lower the valve 81 from the opening 82ª, which permits the air in the chamber 83 to be sucked out to relieve the pressure on the secondary diaphragm 90 and allow valve stem 91 to drop. When valve stem 91 drops, the valve 92 again cuts off the chamber 93 and pneumatic 66 from suction chamber 84, while valve 95 in dropping permits the external air to expand said pneumatic 66 again, and allows the typewriter key to resume its normal position.

The opening and closing of the apertures in each tracker board is effected by means of a perforated master sheet 98, Fig. 13. These perforations 99 are arranged across the master sheet, according to the key or pneumatic desired to be operated, and follow each other along the master sheet, so that ordinarily a pneumatic will collapse and expand again, before a second pneumatic is collapsed.

Each master sheet may have its ends fastened together, and travel over the corresponding tracker board like an endless belt, and may be fed along continuously between feed rolls 100 and 101, the latter being driven by means of a gear 102. This gear 102 is fixed upon a shaft 103 with a disk 104, which is driven by a friction roll 105 fixed to a shaft 106 suitably geared to the main power shaft 72. The speed of the master sheet, which controls the operation of all other parts, may be regulated by shifting the friction roll 105 along the shaft 106 so as to engage the disk 104 at various distances from the center.

Figure 3:
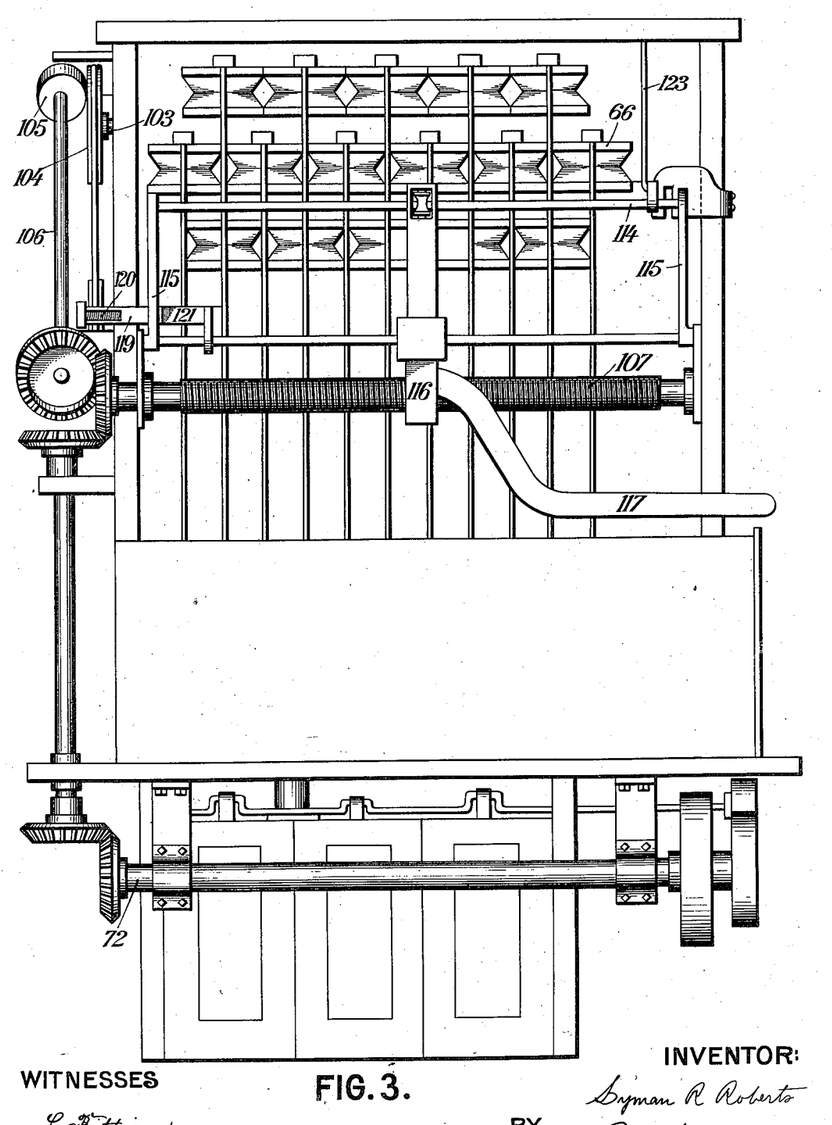
Fig. 3 is an end view of the operator with the typewriter and envelop feeder removed.
Figure 4:
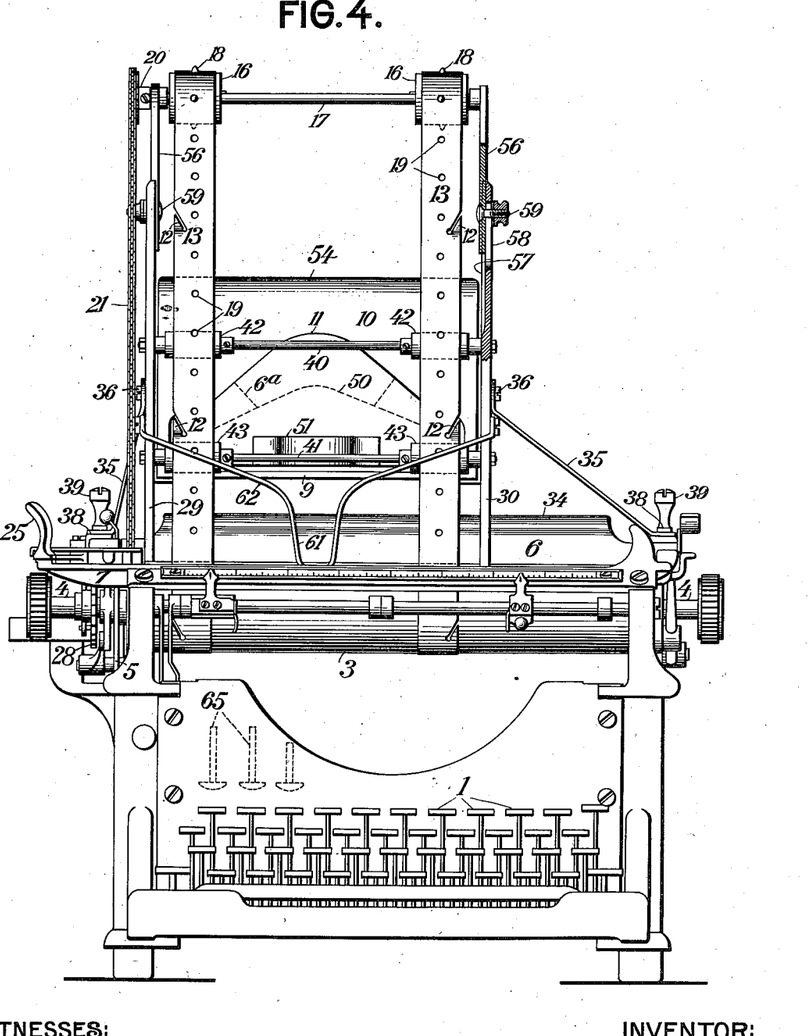
Fig. 4 is a front elevation of the parts shown in Fig. 2.
Figure 5:
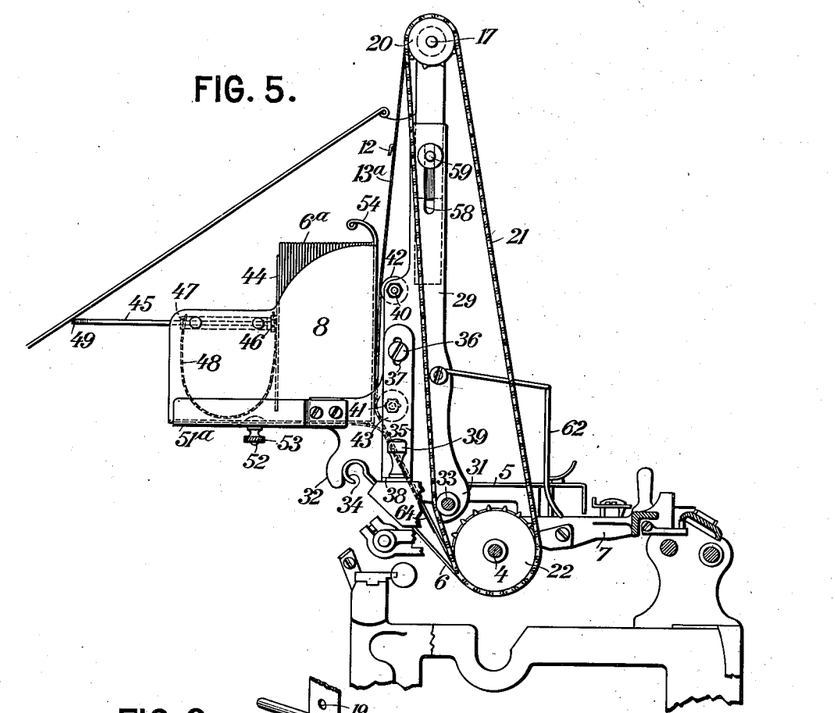
Fig. 5 is a side elevation of the envelop feeder.

When the carriage 7 of the typewriting machine has reached the limit of its travel, the work-sheet may be line-spaced and the carriage returned, by means of a screw or worm 107, constantly driven by suitable gearing and shafting from the main shaft 72. Whenever the carriage is to be returned or the work-sheet in the carriage is to be line-spaced or fed forward, a perforation in the master sheet 98 brings a special pneumatic 108 into operation, to rock a bell crank 109 by means of a connecting link 110, to thrust forward a plunger 111. The free end of this plunger normally rides upon a support 112, and is provided with a stepped portion 113, so that the plunger will rise when it is thrust forward to a certain extent. When the plunger 111 moves forward it strikes a rod 114 of a rocking frame 115, which carries a slidable half-nut or toothed member 116, and swings the latter into engagement with the constantly rotating screw or worm 107. The toothed member 116, upon engaging the screw or worm 107, will be moved along the frame 115 to the right (left in Fig. 3), and draw back the carriage 7 by a finger 117, whose looped end 118 engages the line-space lever 25. Returning the carriage 7 by means of the line-space lever 25, forces back the usual slide 26 and causes the pawl 27 to feed the ratchet wheel 28 and platen 3, to advance the work-sheet. To keep the toothed member 116 in engagement with the screw or worm 107 until the carriage has returned to its initial starting position, the rock frame 115 is locked in its forward position by a latch 119, forced behind said frame by a spring 120. In returning, the toothed member 116 strikes the latch 119 and forces it back until the thin portion 121 permits the rock frame to return to its normal position and disengage the member 116 from the screw.

The feeding of the master sheets 98 is automatically stopped while the carriage is returned, by lifting the pressure rolls 100 from the master sheets, accomplished through means of bell crank 122 connected with a rod 123 to the rock frame 115, so that when said rock frame moves forward to engage the member 116 with the screw or worm 107, the arm 124 of the bell crank 122 will raise the supporting arms 125 of the pressure feed rolls 100, whereupon the feed rolls 101 will rotate idly without carrying along the master sheet. The bell crank arm 124 is connected through a vertical link to a similar arm for lifting the lower roll-supporting arms 125 so that both upper and lower rolls 100 are lifted.

The introduction of the work member into the typewriter up to the writing point, and feeding of the work member out of the typewriter when the address is completed, are controlled by a second master sheet, which is endless and is arranged to run over the lower tracker 77. This lower master sheet contains perforations for causing action of the pneumatic 108 controlling the line-spacing mechanism, as hereinbefore described; and at each operation of the line-space mechanism, an envelop is advanced a step. Repeated actuation causes the envelop to be advanced to writing position. When the envelop is sufficiently advanced, the lower master sheet is silenced. A perforation in the lower master sheet causes the actuation of a pneumatic to collapse a power pneumatic 126 connected to rock a bell crank 127, to thrust forward the bar or plunger 128 and cause its free end 129 to strike a pin 130 on lever 131, and force cam roll 132 under the cam portion 133 on the lower feed roll supporting arm 125, and raise or release the latter to stop the lower master sheet from feeding. At the same time the upper master sheet is made active. The upper cam roll 134 is withdrawn from beneath the cam portion 135 on the upper supporting arm 125, which drops and causes the upper or address master sheet to travel for writing the address. After the address is completed, the upper master sheet is silenced. A perforation in the upper or address master sheet causes a power pneumatic 136 to collapse and rock a bell crank 137, to thrust the bar 138 forward to strike the pin 139 on the rocking lever 131, and force the upper cam roll 134 beneath the cam portion 135 of the upper feed roll supporting arm again. This stops the upper or address master sheet, and the lower master sheet starts again, to feed out the addressed envelop and insert a fresh one, whereupon the address sheet is started again to write another address.

The bars 128 and 138 used for shifting the rocking lever 131, which controls the feeding of the master sheets, are supported near their forward ends upon pins 140, and are provided with stepped portions or cams 141, to gage the distance the lever is to be moved, by raising the bar clear of the path of the pin 130 or 139.

Variations may be resorted to within the scope of the invention, and portions of the improvements may be used without others.

Having thus described my invention, I claim:

1. The combination with a typewriting machine having a platen, of an envelop magazine, type-operating means, master sheet mechanism controlling said type-operating means, a bodily movable envelop carrier having means for positively seizing the envelops *seriatim* and withdrawing them from the magazine, and means controlled by the master sheet mechanism for causing said carrier to pass the magazine and for advancing the envelop positively and arresting it at a predetermined position upon the platen with reference to the writing line thereon.

2. The combination with a typewriting machine having a platen, of an envelop magazine, type-operating means, master sheet mechanism controlling said type-operating means, a bodily movable envelop carrier having means for positively seizing the envelops *seriatim* and withdrawing them from the magazine, and means controlled by the master sheet mechanism for causing said carrier to pass the magazine and for advancing the envelop positively and arresting it at a predetermined position upon the platen with reference to the writing line thereon, and then line-spacing the envelop and discharging it while advancing another envelop to the printing line on the platen.

3. The combination of a typewriting machine having a platen, an envelop magazine, type-operating means, master sheet mechanism controlling said type-operating means, and means controlled by said master sheet mechanism for positively withdrawing envelops *seriatim* at predetermined intervals from said magazine, and positively carrying them to a predetermined position upon said platen.

4. The combination of a typewriting machine having a platen, an envelop magazine, type-operating means, master sheet mechanism controlling said type-operating means, and means controlled by said master sheet mechanism for positively withdrawing envelops *seriatim* at predetermined intervals from said magazine, and positively carrying them to a predetermined position upon said platen, and then effecting the line-feeding and discharge of the envelops.

5. The combination with a typewriting machine having a platen, of an envelop magazine, type-operating means, master sheet mechanism controlling said type-operating means, and means controlled by said master sheet mechanism for positively seizing the envelops *seriatim* and withdrawing them from the magazine and advancing them to a predetermined position upon the platen.

6. The combination with a typewriter platen, of type-operating means, master sheet mechanism controlling said type-operating means, an envelop magazine, means having a positive driving connection with said platen and moving past said magazine for seizing the envelops *seriatim* and advancing them to the platen and holding them in a predetermined position thereon, and an automatic mechanism controlled by the master sheet mechanism for effecting rotation of said platen.

7. The combination with a typewriting machine, including a revoluble platen, of an envelop magazine, type-operating means, master sheet mechanism for controlling said type-operating means and for line-spacing the platen, and an envelop conveyer in the form of an endless band passing around said platen and past said magazine and having thereon envelop-seizers at equal intervals, the distance from each envelop seizer to the next being a multiple of the line-spacing distance or movement of the platen, and said master sheet mechanism having means for line-spacing the platen to an extent equal to the distance between said seizers at each envelop-feeding and spacing operation.

8. The combination, with a platen; of an envelop feeder for said platen; type-operating means; master sheet mechanism controlling said type-operating means; means actuated automatically by said master sheet mechanism for rotating said platen; and connections between said platen and said feeder for transmitting the movement of the former to the latter.

9. The combination, with a platen; of an envelop feeder for said platen having spaced means thereon to engage the flaps of the envelops, so as to remove individual envelops from a pack and supply them to the platen; type-operating means; and master sheet mechanism controlling said type-operating means and connected to intermittently drive said feeder through distances corresponding exactly to the spaces between successive flap-engaging means.

10. The combination, with a platen; of type-operating means; an envelop magazine; a carrier having means for positively seizing the envelops from said magazine; an automatic operator controlling said type-operating means; and mechanism also under the control of said operator for driving said carrier so as to positively advance said envelops one at a time to a precisely-determined position upon the platen, and thereafter line-space said envelops and finally positively discharge them.

11. The combination with a typewriting machine having a revoluble platen, of a magazine for envelops, a conveyer for engaging the envelops and positively carrying them *seriatim* to writing position on the platen, a continuously operating power-driven element, type-operating means, and master sheet mechanism for controlling said type-operating means and for intermittently effecting a driving connection between said power driven element and the conveyer for operating the latter.

12. The combination with a typewriting machine having a revoluble platen, of a magazine for envelops, a conveyer having means to engage the envelops and positively carry them from the magazine to the platen and hold them stationary in printing position on the platen, a continuously operating driver, and automatic means for intermittently effecting an operating connection between said driver and said conveyer for operating the latter.

13. The combination with a typewriting machine having a revoluble platen, of a magazine for envelops, a conveyer having means to engage the envelops and positively carry them from the magazine to the platen and hold them stationary in printing position on the platen, a continuously operating driver, a power-transmitting member movable into and out of operative relation to said driver, means operated by said transmitting member to drive said conveyer, type-operating means, and master sheet mechanism for controlling both said type-operating means and the said movements of said transmitting member.

14. The combination with a typewriting machine having a revoluble platen, of a magazine for envelops, a conveyer having means to engage the envelops and positively carry them from the magazine to the platen and hold them stationary in printing position on the platen, a continuously operating driver, a line-spacing mechanism for effecting line-space rotations of the platen, driving connections between the platen and the conveyer for operating the latter when the platen is rotated, type-operating means, and master sheet mechanism for controlling said type-operating means and for automatically effecting a connection between the line-space mechanism and said driver to cause the operation of the line-space mechanism and thereby bring the envelops to position on the platen.

15. The combination with a typewriting machine having a revoluble platen, of a magazine located at the intake side of the platen, a flexible conveyer running over the platen, means on said conveyer for engaging the flaps of envelops in said magazine and carrying them from the magazine onto the platen, means for guiding the conveyer from the magazine directly to the platen, means to hold the envelops on the conveyer as they are carried to the platen, type-operating means, and master sheet mechanism for controlling said operating means and for automatically effecting intermittent operations of the conveyer through predetermined distances, thereby carrying the envelops *seriatim* from the magazine to writing position on the platen, and holding them in such position during the printing operation.

16. The combination, with a typewriting machine including a platen; of an envelop magazine; type-operating means; master-sheet mechanism controlling said type-operating means; and a train of mechanism extending from said master-sheet mechanism to said magazine and also under the control of the former, for taking the envelops from the magazine and imparting to each envelop a prelimited traveling movement to bring it to a precisely-predetermined position upon the platen with reference to the writing line thereon.

17. The combination, with a typewriting machine including a platen; of an envelop magazine; type-operating means; master-sheet mechanism controlling said type-operating means; and a train of mechanism extending from said master-sheet mechanism to said magazine and also under the control of the master-sheet, for taking the envelops from the magazine and imparting to each envelop a prelimited traveling movement to bring it to a precisely-predetermined position upon the platen with reference to the writing line thereon, said train of mechanism including an envelop-seizing and carrying device mechanically connected to the platen to be timed thereby, and also including means operable repeatedly under the control of the master-sheet during the travel of the latter for effecting concurrent step-by-step advance movements of the platen and the envelop-carrying device connected thereto, to advance each envelop from the magazine a predetermined number of steps preparatory to writing the first line thereon.

18. The combination, with a typewriting mechanism, including a platen and line-spacing mechanism therefor; of an envelop magazine; type-operating means; master-sheet mechanism for controlling the actuation thereof; an envelop carrier arranged to pass said magazine, and to travel therefrom to said platen, said carrier being provided, at intervals equal to exact multiples of the line-spacing movement of the platen, with pickup devices for positively seizing the envelops and withdrawing them one after another from the magazine; and automatic means under the entire control of the master-sheet mechanism for causing said carrier to automatically and positively advance a fresh envelop to precise initial printing position on the platen by means of each multiple line-spacing movement of said platen.

19. The combination, with a typewriting mechanism, including a platen and line-spacing mechanism therefor; of an envelop magazine; type-operating means; master-sheet mechanism for controlling the actuation thereof; an envelop carrier arranged to pass said magazine, and to travel therefrom to said platen, said carrier being provided, at intervals equal to exact multiples of the line-spacing movement of the platen, with pickup devices for positively seizing the envelops and withdrawing them one after another from the magazine; and automatic means under the entire control of the master-sheet mechanism for causing said carrier to automatically and positively discharge a completely-typed envelop from said platen by means of each multiple line-spacing movement thereof, and to concurrently advance a fresh envelop to precise initial printing position on said platen.

20. The combination, with a typewriting mechanism, including a platen and line-spacing mechanism therefor; of an envelop magazine; type-operating means; master-sheet mechanism for controlling the actuation thereof; an endless carrier band arranged to pass said magazine, and to travel therefrom to said platen, said band being provided, at intervals equal to exact multiples of the line-spacing movement of the platen, with pick-up devices for positively seizing the envelops and withdrawing them one after another from the magazine; and automatic means under the entire control of the master-sheet mechanism for imparting to said band the exact movement required for bringing the envelop to the precise initial printing position on said platen preparatory to writing the first line thereon.

21. The combination, with a typewriting mechanism, including a platen and line-spacing mechanism therefor; of an envelop magazine; type-operating means; master-sheet mechanism for controlling the actuation thereof; an endless carrier band arranged to pass said magazine, and to travel therefrom to said platen and around and beyond the same, said carrier being provided, at intervals equal to exact multiples of the line-spacing movement of the platen, with pick-up devices for positively seizing the envelops and withdrawing them one after another from the magazine; and automatic means under the entire control of the master-sheet mechanism for causing said band to automatically and positively discharge a completely-typed envelop from said platen by means of the line-spacing movement thereof, and to concurrently advance a fresh envelop to precise initial printing position on said platen.

22. The combination, with a typewriting mechanism, including a platen; of an envelop magazine; type-operating means; master-sheet mechanism for automatically controlling the actuation thereof; an envelop carrier arranged to pass said magazine and to travel from the same to said platen, and having means for positively seizing the envelops and withdrawing them one after another from the magazine; and automatic means controlled by the master-sheet mechanism for causing said carrier to automatically and positively advance in succession to the platen each envelop carried thereby, so as to afford the master-sheet entire control over the initial printing position of the envelop on the platen.

23. The combination with a typewriting machine, including types and a platen, of a magazine for work-pieces, a feeder for removing the work-pieces *seriatim* from said magazine and positively carrying them to writing position on said platen, automatic actuating means for said types and platen, automatic actuating means for said feeder, a separate control set for each of said automatic means, and means for shifting the action from one to the other.

24. The combination with a typewriting machine, including types and a platen, of automatic means for actuating said types and platen, a control set for said automatic means, a magazine for work-pieces, a feeder for removing the work-pieces *seriatim* from said magazine and positively carrying them to writing position on said platen, automatic actuating means for operating said feeder, a control set for said last-mentioned automatic actuating means, said control sets being arranged to be alternate in their action, so that one of said automatic actuating means will be silent while the other is active, and vice versa, and means for changing the activity from one control set to the other control set.

25. The combination with a typewriting machine, including types and a platen, of automatic means for actuating said types and platen, a magazine for work-pieces, a feeder for removing the work-pieces *seriatim* from said magazine and positively carrying them to writing position on said platen, a master sheet for controlling the operation of said automatic means, and a separate master sheet for controlling the operation of said feeder.

26. The combination with a typewriting machine, including types and a platen, of automatic means for actuating said types and platen, a magazine for work-pieces, a feeder for removing the work-pieces *seriatim* from said magazine and positively carrying them to writing position on said platen, a master sheet for controlling the operation of said automatic means, a separate master sheet for controlling the operation of said feeder, and feeding mechanism for said master sheets arranged to feed the one while the other is passive, and vice versa.

LYMAN R. ROBERTS.

Witnesses:
WALTER H. DAYTON,
ARTHUR JOHNSON.